No. 626,219. Patented June 6, 1899.
W. & A. CASTLE.
FOOD WARMER.
(Application filed May 16, 1898.)
(No Model.)
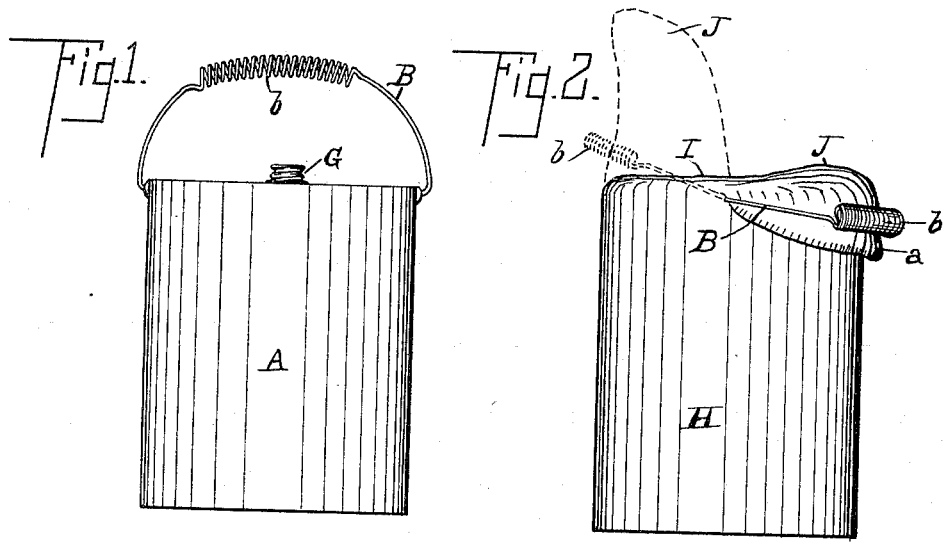
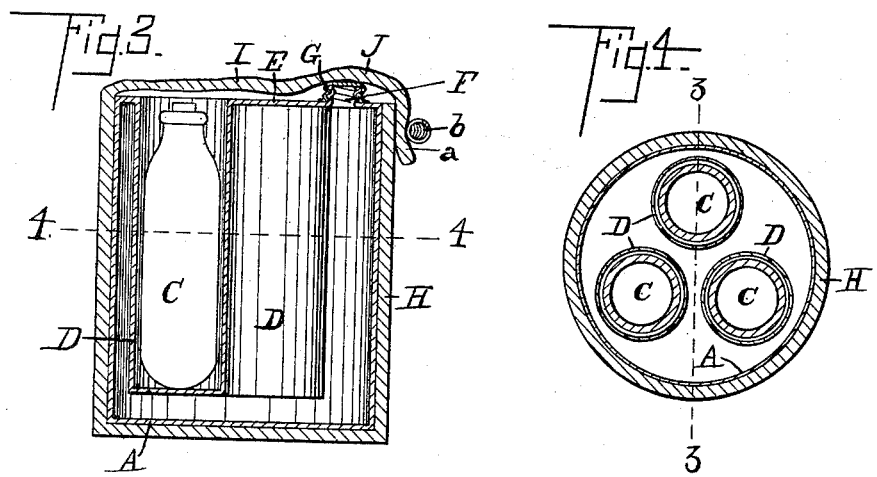
Witnesses.
Sadie Coryell
F. Bissell
Inventors:
Wilmot Castle
Arthur Castle
by
Osgood & Davis
Their Attorneys.

UNITED STATES PATENT OFFICE.

WILMOT CASTLE AND ARTHUR CASTLE, OF ROCHESTER, NEW YORK.

FOOD-WARMER.

SPECIFICATION forming part of Letters Patent No. 626,219, dated June 6, 1899.

Application filed May 16, 1898. Serial No. 680,765. (No model.)

*To all whom it may concern:*

Be it known that we, WILMOT CASTLE and ARTHUR CASTLE, citizens of the United States, and residents of Rochester, in the county of Monroe and State of New York, have invented certain new and useful Improvements in Food-Warmers, of which the following is a specification.

This invention relates to certain new and useful improvements in food-warmers; and it consists, substantially, in such features of construction, arrangement, and combination of parts as are hereinafter more particularly described.

The invention has for its object to provide means for heating foods—as, for instance, milk—for keeping the same warm, and for avoiding expensive construction.

In the accompanying drawings, Figure 1 is a view of our improved food-warmer in side elevation without its jacket or cozy. Fig. 2 is a similar view showing in full lines the bail closed down against the side of the warming vessel upon the flap and showing in dotted lines the bail thrown back and flap raised. Fig. 3 is a vertical sectional elevation on the line 3 3 of Fig. 4, and Fig. 4 is a horizontal sectional view on the line 4 4 of Fig. 3.

We employ a metallic vessel, preferably of copper, of suitable size to contain one or more smaller vessels, such as bottles or jars, which latter contain the milk or other food to be heated. Said outer vessel is of any desired form and is preferably provided with a bail to enable the same to be conveniently carried. Inclosing the vessel is a cozy or covering of non-conducting material, such as felt, which fits the vessel closely on all sides. Said cozy is provided with a closing-flap, and a closure device is also provided. This closure device may be of any suitable construction and may be attached directly to the flap; but in the form shown in the drawings the bail of said vessel performs the function of securing the flap.

In the drawings, A represents the heating and warming vessel, and B is its bail. The said warming vessel A in the present instance is herein shown as adapted to contain three inner vessels C of the kind ordinarily employed for milk and other similar foods. Said inner vessels are supported within the vessel A in inner tubes or pockets D, which are in height and diameter adapted to receive the jars. Said tubes are closed at their lower ends and open at their upper ends. They are suspended from the top or lid E of the vessel A in any suitable manner. In Fig. 3 they are shown integral with said top E. They do not reach to the bottom of the outer vessel A and are so arranged as to have spaces between them and between each of them and the inner sides of said vessel A. The tubes are therefore heated uniformly by the hot water or other heating agent contained in the vessel A, which entirely surrounds them. In the top E of the vessel A is an orifice F, through which the hot water is poured into the said vessel and which is closed by an ordinary screw-cap G.

H is a removable cozy or jacket, of non-conducting material, which fits the vessel closely and is provided at the top with a lid portion I, having a flap J, which latter extends down on one side of the vessel, as shown at *a*, Fig. 3. The bail B is connected to the vessel A at or near its top edge, and the bail protrudes between the cozy and its lid portion I. We shape the bail B substantially in conformity with the side of the vessel A and its covering, so that by turning the said bail down over the flap, as shown in Fig. 2, the said flap, as well as the entire lid portion I, is thereby securely closed upon the vessel. The said bail B may be made simply of a piece of spring-wire bent into the desired shape; but we preferably make it with a number of coils *b*, so as to make it elastic and distensible, which permits it to conform closely to the shape of the vessel A and its cozy, and thereby more effectually closes the flap J.

After the vessels C have been filled and inserted within the tubes in the vessel A their contents are kept warm for a considerable time by the heating agent in the vessel A and the retardation of the escape of heat by the use of the cozy.

What we claim is—

1. A food-warmer comprising an outer vessel provided with inner suspended tubes for the reception of removable vessels, said tubes being separated from each other and from the body of the vessel by spaces, a cozy or jacket of non-conducting material, provided with a flap and a closure device for said flap.

2. A food-warmer comprising a suitable vessel having a handle or bail, and a cozy or non-conducting jacket around said vessel and having a closing-flap, said bail or handle also constituting a closure device for the flap.

3. A food-warmer comprising a suitable vessel, and a cozy or non-conducting jacket around said vessel and having a closing-flap extending over the top of the vessel and over the side thereof, and a handle for the vessel adapted to be turned down over the flap, and to hold the same against the body of the cozy.

4. A food-warmer comprising a suitable vessel, a cozy or non-conducting jacket therefor having a closing-flap, and a handle for the vessel formed with a number of coils or convolutions and adapted to be turned down to hold the flap against the body of the vessel.

WILMOT CASTLE.
ARTHUR CASTLE.

Witnesses:
FRANCIS BISSELL,
C. R. OSGOOD.